United States Patent [19]

McCarty

[11] Patent Number: 5,666,411
[45] Date of Patent: Sep. 9, 1997

[54] SYSTEM FOR COMPUTER SOFTWARE PROTECTION

[76] Inventor: Johnnie C. McCarty, 2304 Wright Cir., Round Rock, Tex. 78664

[21] Appl. No.: 180,602

[22] Filed: Jan. 13, 1994

[51] Int. Cl.$^6$ .................................................... H04L 9/00
[52] U.S. Cl. ................................................. 380/4; 380/25
[58] Field of Search ........................................ 380/3, 25, 4

[56] References Cited

U.S. PATENT DOCUMENTS

| | | | |
|---|---|---|---|
| 4,278,837 | 7/1981 | Best | 380/4 |
| 4,558,176 | 12/1985 | Arwold et al. | 380/4 |
| 4,613,901 | 9/1986 | Gilhousen et al. | 380/25 |
| 4,757,534 | 7/1988 | Matyas et al. | 380/25 |
| 4,759,062 | 7/1988 | Traub et al. | 380/25 |
| 4,864,494 | 9/1989 | Kobus, Jr. | 380/4 |

Primary Examiner—Salvatore Cangialosi
Attorney, Agent, or Firm—David G. Henry

[57] ABSTRACT

This system protects proprietary software from disclosure and unauthorized use, enforces license limits on number of users of the software, and prevents corruption of protected software by computer viruses. Software protected under this system may execute only on computer systems which incorporate a microprocessor capable of deciphering enciphered instructions in real time. Program files are first enciphered under control of a distribution cipher key. Prior to first use of software, program files must be customized on the user computer system. This customization procedure re-enciphers the programs, so that they are enciphered under a second cipher key. Customized programs may not execute on a computer system other than one constructed with a processor chip which incorporates a crypto microprocessor. The crypto microprocessor is capable of performing this re-encipherment, and of executing both enciphered and unenciphered programs. The customization program runs on user's computer system and normally accesses a remote Exchange database system by means of a modem to accomplish its task. Variations of customization process provide for storage of enciphered software on either a single system, a network server, or a site license repository system.

12 Claims, 11 Drawing Sheets

CRYPTO TRANSLATION UNIT

OVERVIEW OF THE SYSTEM
FIG. 1A   SOFTWARE VENDOR
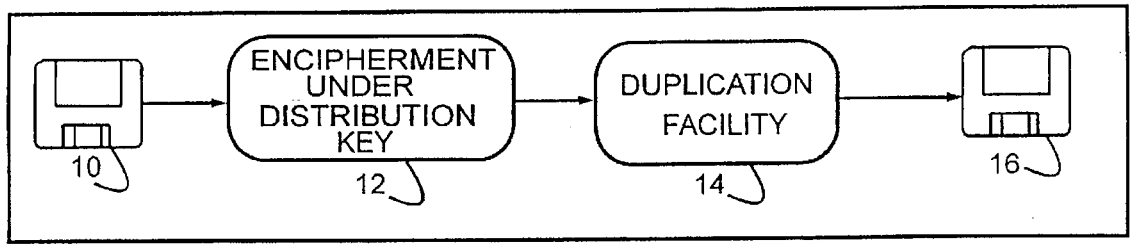
FIG. 1B   HARDWARE REQUIREMENTS
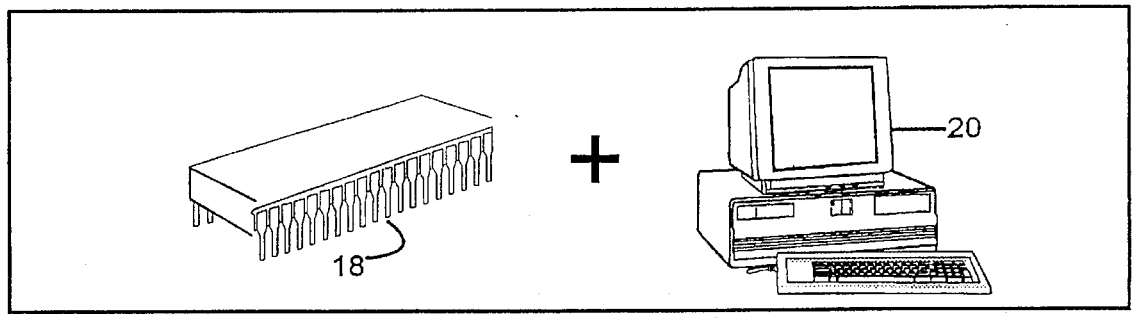
FIG. 1C   USER INSTALLATION/CUSTOMIZATION
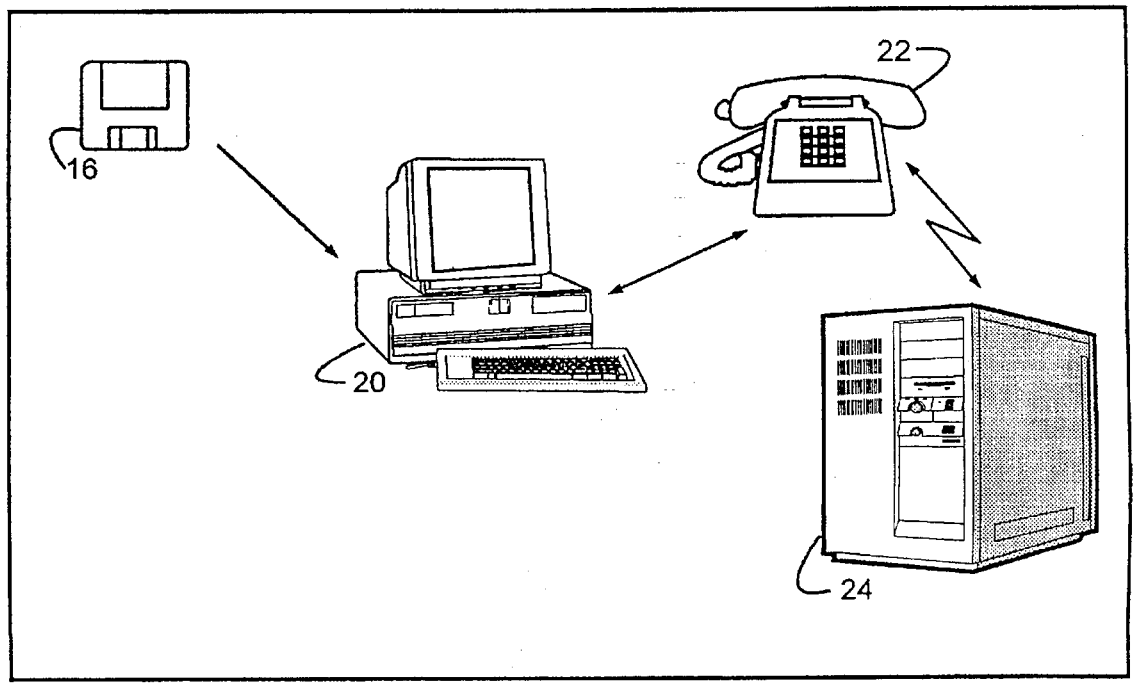

FIG. 2  CUSTOMIZATION - SINGLE SYSTEM MODE
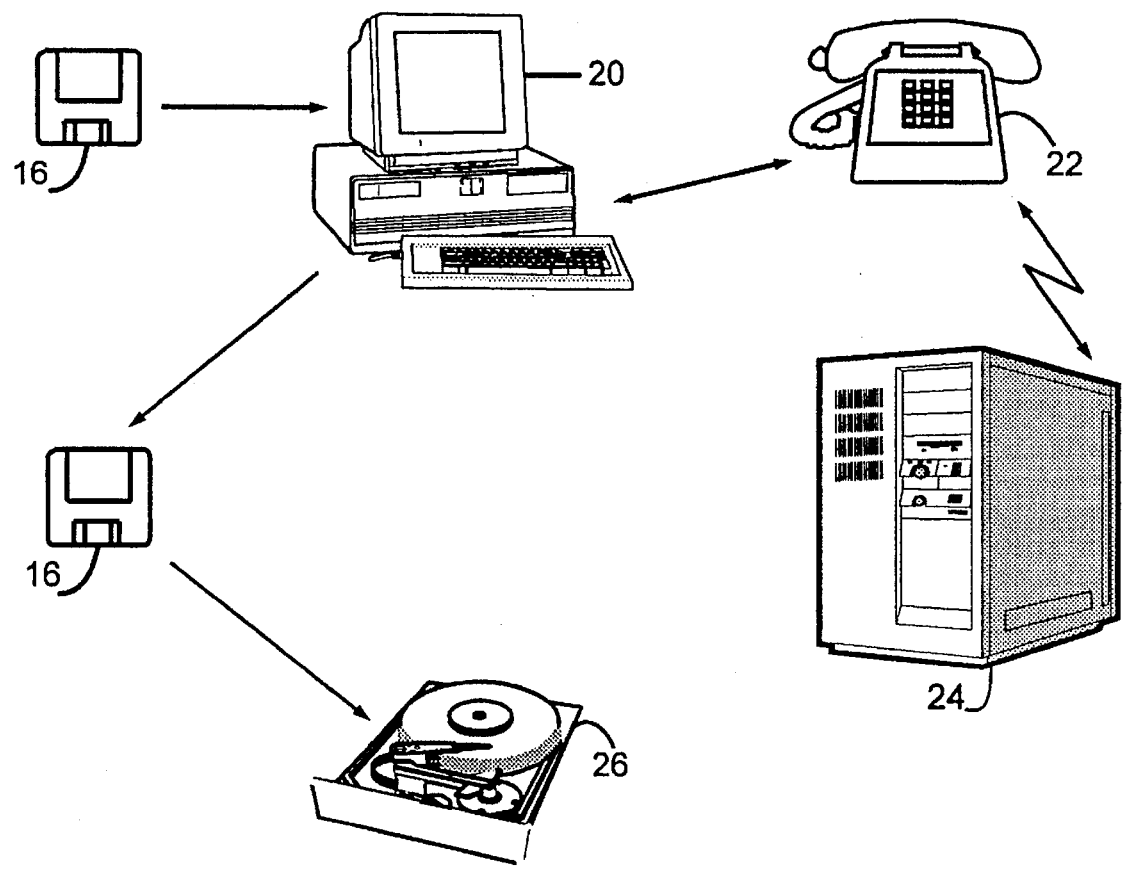

FIG. 3    CUSTOMIZATION - NETWORK SERVER MODE
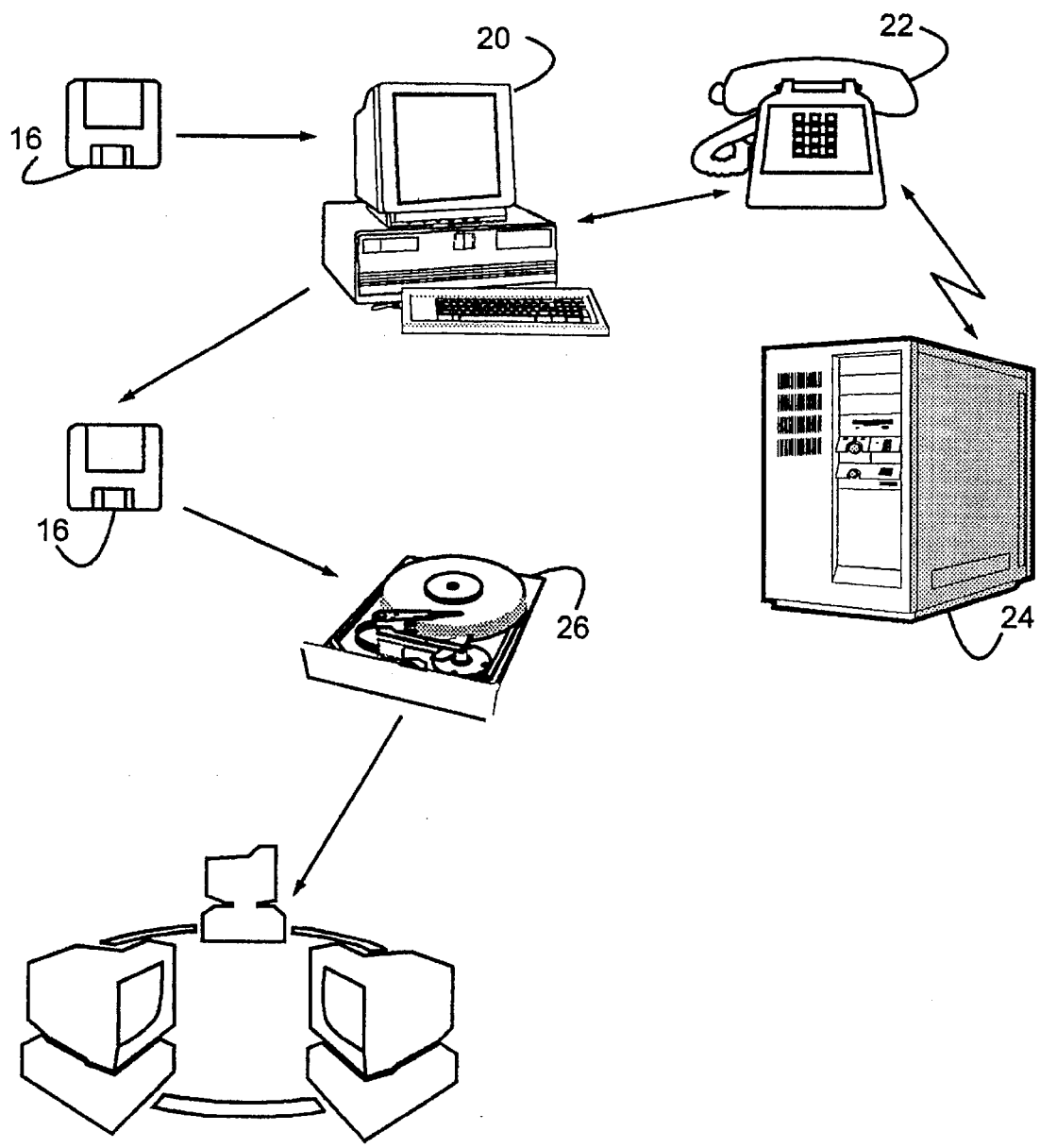

FIG. 4 CUSTOMIZATION - SITE LICENSE MODE
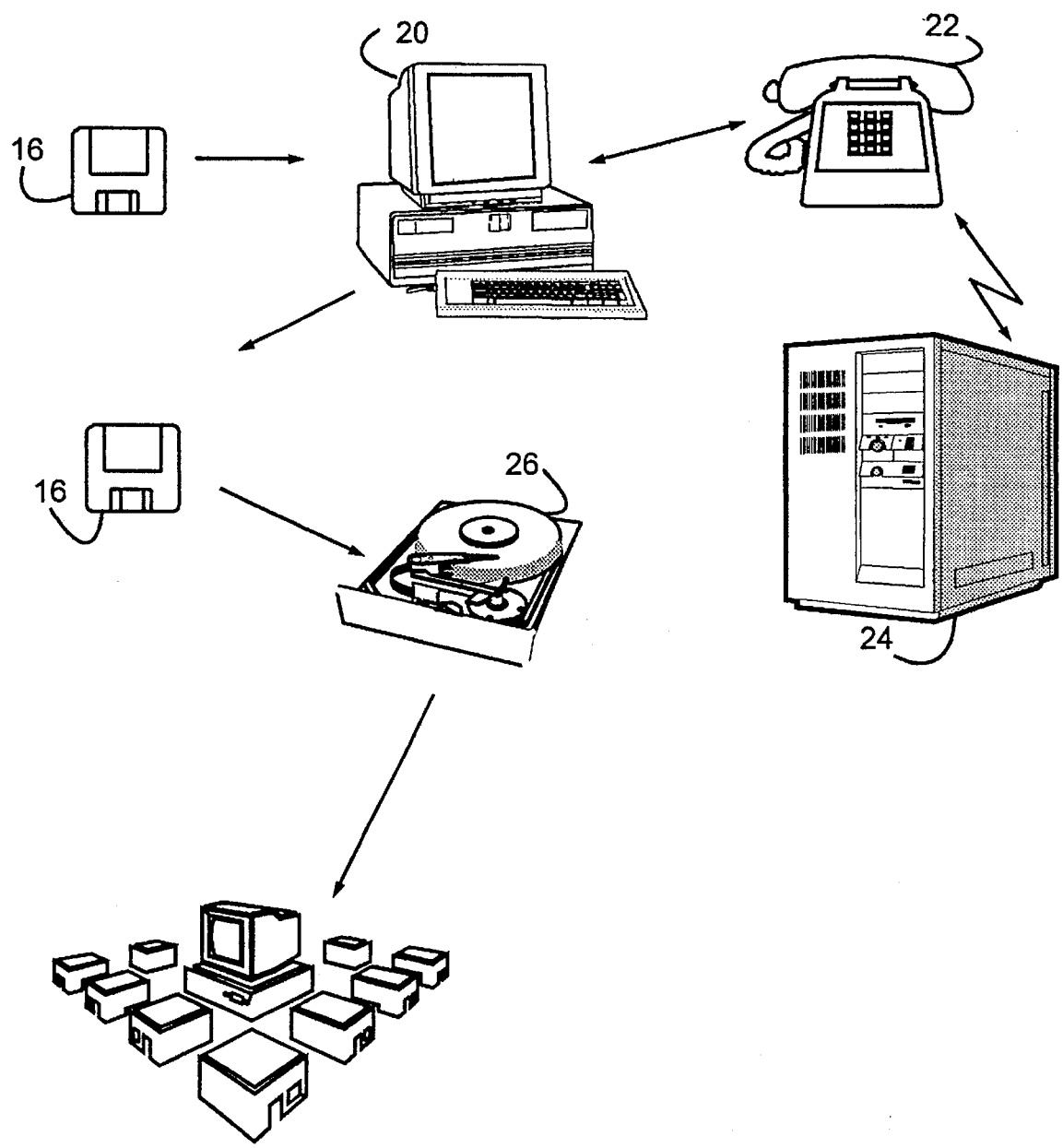

FIG. 5   CCR AS TRANSMITTED TO EXCHANGE

| ICODE | -- ACTION TO TAKE | 4 BYTES |
|---|---|---|
| SYSID | -- SYSTEM IDENTIFIER | 8 BYTES |
| COUNT | -- CONCURRENT USERS | 4 BYTES |
| PGMID | -- PROGRAM IDENTIFIER | 8 BYTES |

FIG. 6   CCR AS RETURNED TO INSTALL

| RCODE | -- RESPONSE CODE | 4 BYTES |
|---|---|---|
| SYSID | -- SYSTEM IDENTIFIER | 8 BYTES |
| COUNT | -- CONCURRENT USERS | 4 BYTES |
| PGMID | -- PROGRAM IDENTIFIER | 8 BYTES |
| ES(PGMKEY) | -- PROGRAM CIPHER KEY ENCIPHERED UNDER SYSKEY | 16 BYTES |

FIG. 7  CRYPTO CONTROL MEMORY

| | |
|---|---|
| SYSID | 8 BYTES |
| DEVID | 8 BYTES |
| SYSKEY | 16 BYTES |
| DEVKEY | 16 BYTES |

CRYPTO STATUS WORD 0
- BITS 31-24 - PROGRAM ZONE BYTE
- BITS 23-16 - INTERRUPT ZONE BYTE
- BITS 15- 8 - RESERVED
- BIT 7 - CRYPTO DISABLE
- BITS 6- 4 - CRYPTO DELAY SIZE
- BITS 3- 0 - CRYPTO PAGE SIZE

CRYPTO STATUS WORD 1
- BITS 31- 0 - ZONE MANAGEMENT RECORD POINTER

CRYPTO STATUS WORD 2
- BITS 31- 0 - CONVERSION WORKAREA POINTER

CRYPTO STATUS WORD 3
- BITS 31- 0 - CRYPTO FUNCTION VECTOR TABLE

ZONE MANAGEMENT RECORD
| | |
|---|---|
| ZONE FRACTION KEY | 32 BYTES |
| ZONE PAGE KEY | 32 BYTES |
| ZONE LINE TAG | 4 BYTES |

CONVERSION WORKAREA
| | |
|---|---|
| INPUT PAGE KEY | 32 BYTES |
| OUTPUT PAGE KEY | 32 BYTES |
| INPUT LINE KEY | 32 BYTES |
| OUTPUT LINE KEY | 32 BYTES |

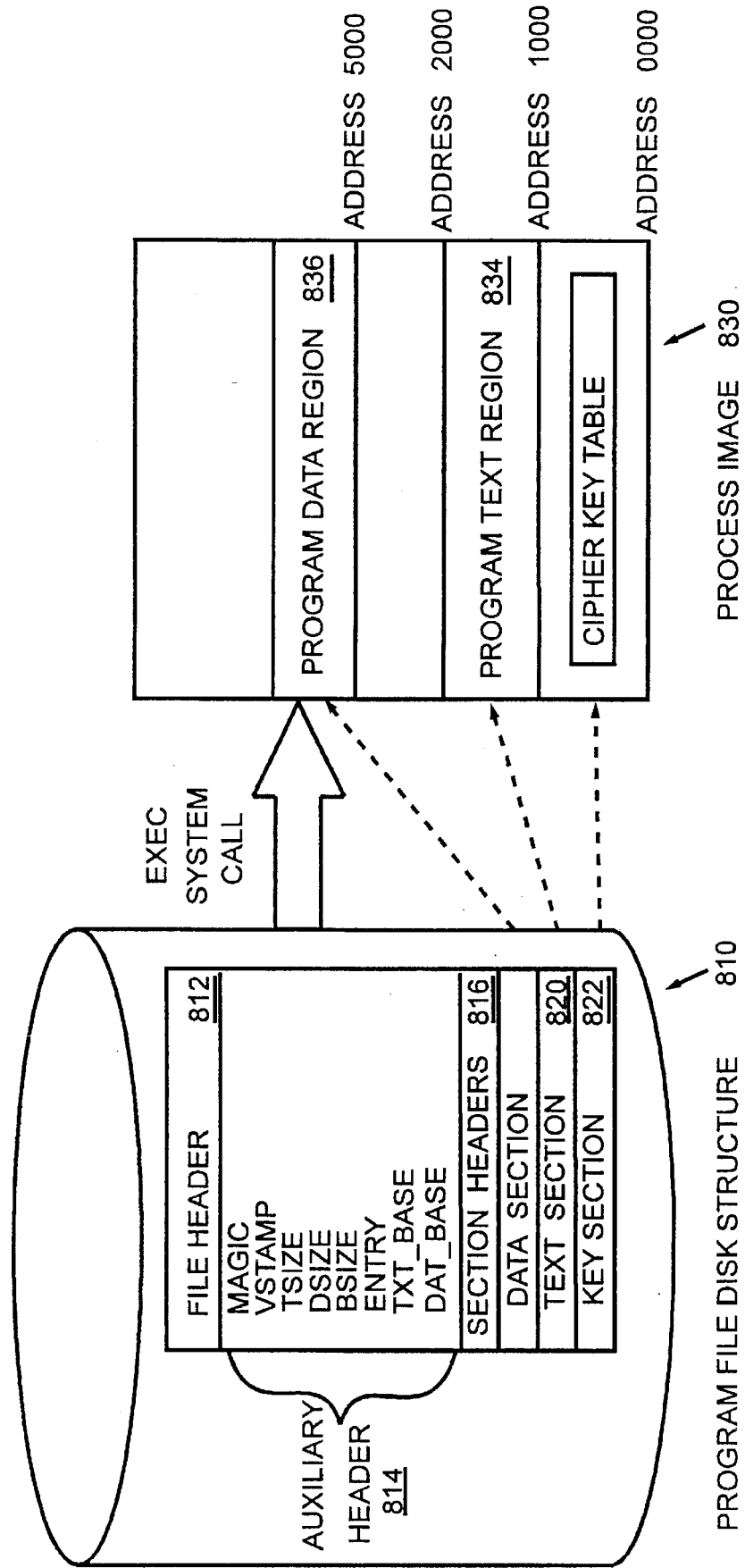
FIG. 8   EXECUTABLE FILE AND PROCESS IMAGE

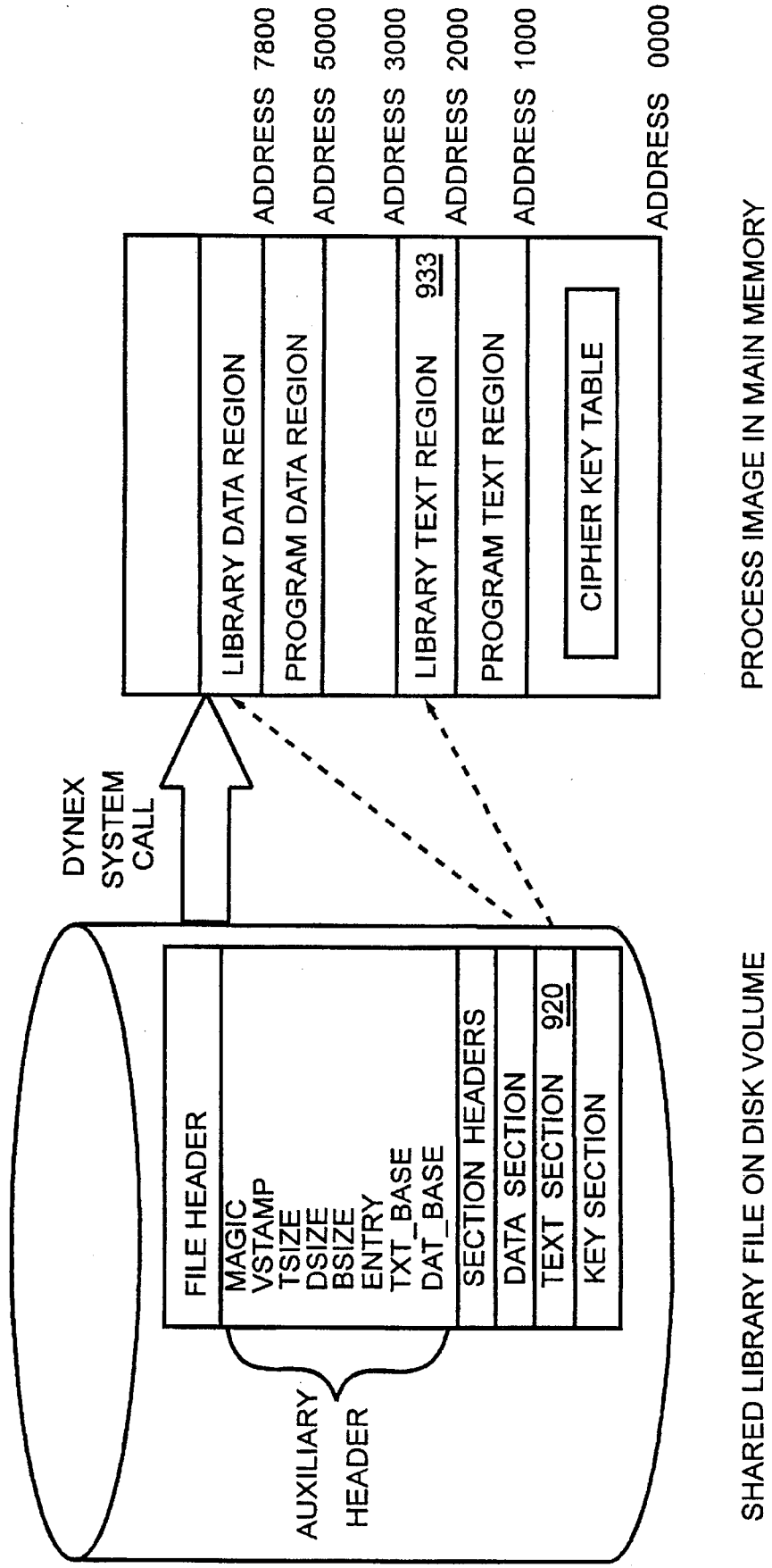
FIG. 9 CRYPTIX DYNAMIC LIBRARY PROCESSING

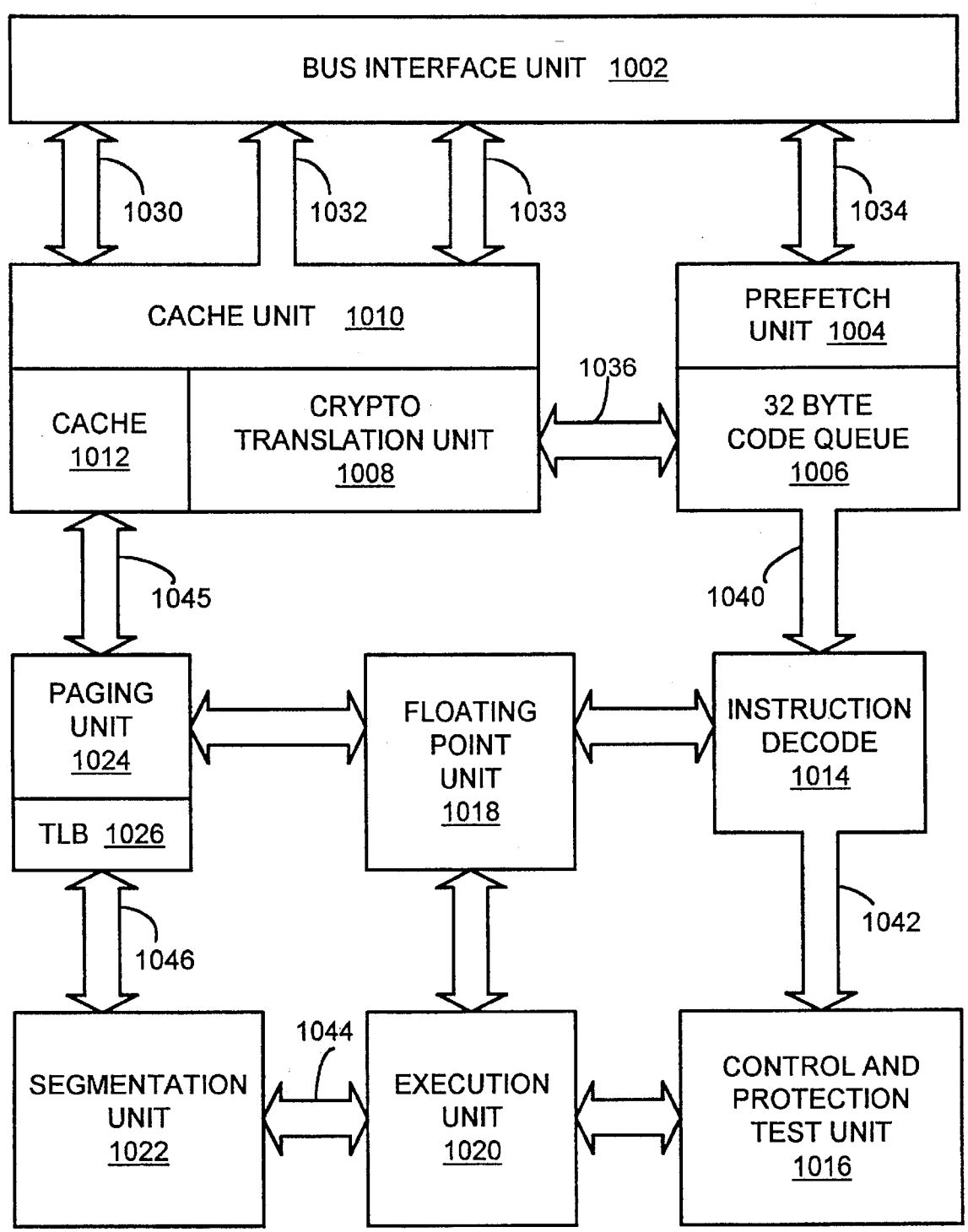
FIG. 10   CRYPTO MICROPROCESSOR

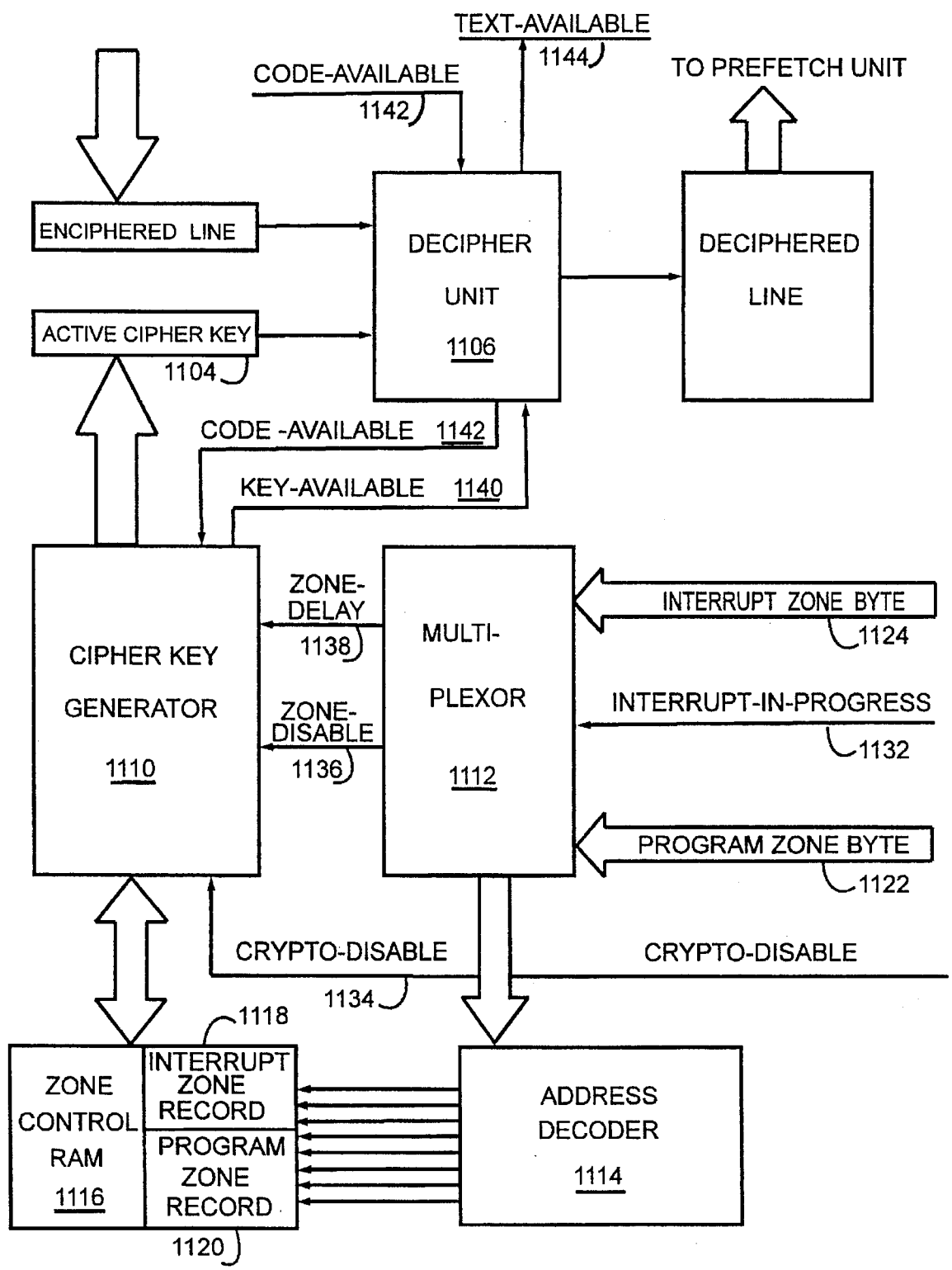
FIG. 11    CRYPTO TRANSLATION UNIT

FIG. 12  CIPHER KEY GENERATOR
12A  LINE TAG
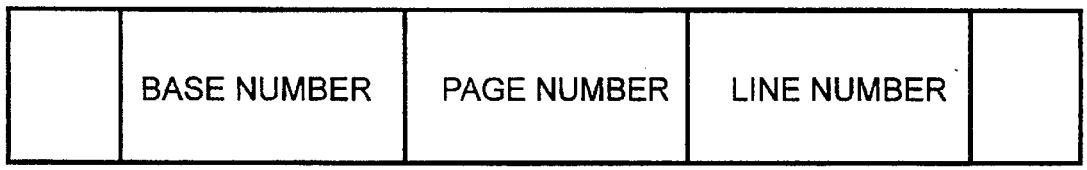
12B  KEY GENERATOR LOGIC
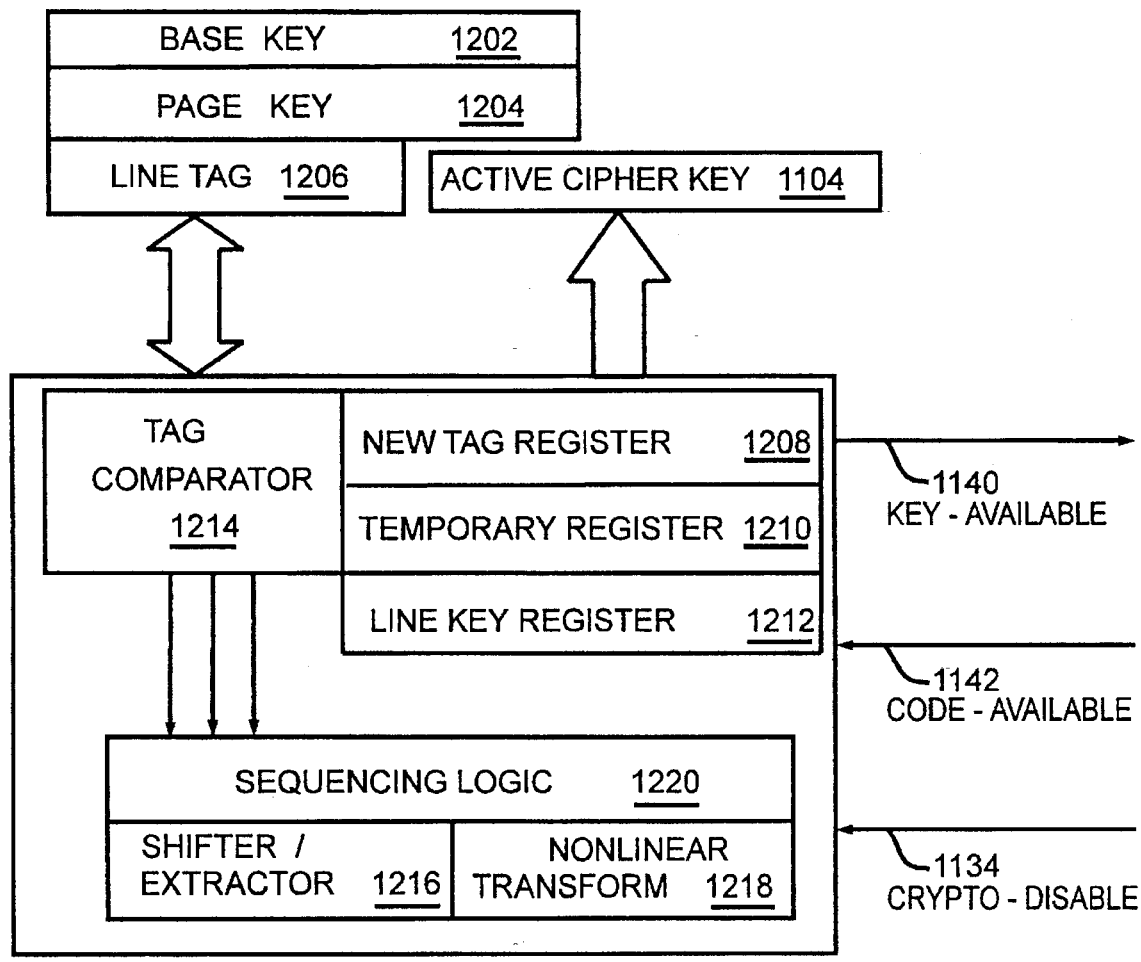

SYSTEM FOR COMPUTER SOFTWARE PROTECTION

BACKGROUND OF THE INVENTION

1. Background-Field of Invention

This invention relates to a system for protecting computer software. More specifically, this invention relates to a cryptographic system for protecting mass marketed software.

2. Background-Description of Prior Art

As of this writing more than 100 million microcomputers are in use worldwide. Encouraged by this large installed base of systems, software developers are creating products at a rapid pace. However, one problem threatens the continued development of reasonably priced software: software piracy, the unauthorized copying of programs. Software vendors have dealt with the piracy issue by various means, both technical and legal, but it still remains a serious problem. The Software Publishing Association, an industry group of more than 900 firms, recently estimated that the industry loses revenues of $2.5 billion annually due to this problem. Although many patents have been issued whose purpose is to discourage or prevent software piracy, the operational mechanism of many of these patents are too complex to be accepted by purchasers of computer software. Computer users have come to expect software products to be easy to use, else they will not buy them.

One method for protecting software (now rarely used) is copy protection. The term "copy protected" means that program distribution media (e.g., floppy diskettes) cannot be copied by normal means. A diskette is formatted, or magnetically encoded, as concentric rings of bit patterns called tracks. Each ring is divided into parts called sectors; normally the number of sectors is the same for all tracks. Each sector is comprised of a header area followed by a data block. A checksum follows, whose value is used to detect errors in the recording process. A typical copy protection scheme modifies an unused sector after a program has been recorded onto the diskette, such that the program may be executed without error, and a copy utility will duplicate the program without detecting the invalid sector. However, the program contains instructions which check the diskette for its error sector, and will terminate if loaded from a copied disk.

The use of this protection method led to development and sale of numerous "bit copier" utility programs, which, unlike standard copy utilities, can produce executable duplicates of the programs. Thus, this form of media copy protection discouraged but did not prevent software piracy.

A second approach to software protection is the use of an electronic security device, sometimes called a dongle, which attaches to one of the computer's external input/output ports. Programs which are to be protected in this way must make procedure calls which interrogate the port to make sure the dongle is in place, and that the dongle has a unique identifier which matches the unique identifier embedded in a location within the program. If the dongle is not there, or if one is attached which has a non-matching identifier, the program terminates. U.S. Pat. No. 4,609,777 to Cargile (1986) and U.S. Pat. No. 4,685,055 to Thomas (1987), describe two such devices. Various manufacturers of dongle devices continue to sell them to software vendors, but most software is still sold without these devices, either because of cost criteria or lack of acceptance by software purchasers. A disadvantage of the hardware dongle protection method is the ease with which a determined perpetrator can crack the protection algorithm by monitoring the port and bus lines with a storage type data analyzer. Another disadvantage is that each software package is typically supplied with its own dongle, so that the user might soon run out of ports. Additionally, the hardware dongle method does not actually conceal instruction codes. By using a well-known technique (disassembly) a skilled programmer could easily find the appropriate interrogation code and disable it.

Protection Criteria

At a minimum, a software protection method should do two things: prevent disclosure of the actual program instruction codes (whether in source or object form) and restrict the use of a software product to the software's purchaser or licensee. One approach which promises to meet these requirements is the use of the crypto microprocessor. A crypto microprocessor is a plug-in replacement device for the conventional microprocessor, but is capable of executing enciphered instructions. An enciphered program may execute only on a designated computer system incorporating a crypto microprocessor which deciphers the program according to a specific cipher key or algorithm. Crypto microprocessors can be built at reasonable cost, since the translation circuitry is not unduly complex. In addition, the method does not interfere with computer user's customary practices. For example, the user is able to copy his software for backup purposes. Equally important, enciphered software can be processed in a manner compatible with current production and distribution methods.

If a method prevents disclosure of program instructions, we say it conceals codes. If a method restricts or assigns the software to one computer system, we say it assigns a system. Table 1 compares protection methods according to these criteria.

TABLE 1

Comparison of Protection Methods

| Method | Conceals Codes | Assigns System |
|---|---|---|
| Copy protect | No | Yes * |
| Dongle | No | Yes * |
| Crypto processor | Yes | Yes |

*Can be defeated in all cases by means discussed

Concealment and assignment criteria must be met for any acceptable protection method, and the comparison above shows that only the crypto processor meets both.

Patents for crypto processors have existed for more than a decade, yet no general-purpose devices are currently being manufactured. The lack of success for these other approaches is partly explained by failure to address the marketing requirement, stemming from cost and logistical criteria, such that software be distributed as standardized, non-customized ("shrink wrapped") packages. For a software protection method to attain market acceptance, it should provide four additional capabilities:

1) User customization. This means that the purchaser may designate the computer system on which the software will reside and execute after the sale rather than prior to purchase. The only alternative to user customization is encipherment by the vendor before its sale. A labor-intensive and expensive approach, pre-sale customization is specified in U.S. Pat. No. 4,633,388 to Chiu (1986), which describes a microprocessor with a means of selecting one of a set of cipher keys for decryption. The microprocessor also supports execution of both enciphered and unenciphered programs, as does U.S. Pat. No. 4,757,534 to Matyas et al. (1988). Although the Matyas et al. patent provides for post-sale customization, the system does not actually employ a crypto processor. Instead, enciphered programs are stored on disk and loaded into "private" memory for execution. Decipherment is performed by ROM-resident software prior to launching the program.

2) Multiple keys. Use of the same cipher key in a crypto microprocessor to decipher all protected programs makes it vulnerable to the "known plaintext" attack. U.S. Pat. No. 5,034,980 to Kubota (1991) proposed a fixed cipher key embedded in each chip. If, for example, a programmer working for a software developer has both a protected version and the plaintext version of a program, he could easily determine the cipher key of a system on which the protected version runs. He could then crack any protected software which was subsequently installed on that system. Because of this weakness, a crypto processor needs to use a different key for deciphering each enciphered program.

3) Network support. It is estimated that by the year 1995, seven of every ten computer systems will be connected to a local area network (LAN). In LAN environments, programs are typically stored on a file server computer, then are loaded from the server's disk drive over the network into the main memory of a requesting workstation, there to be executed. None of the described crypto microprocessors provides for a network server mode.

4) Mixed enciphered/nonenciphered code support. Because a user is likely to possess programs that are not protected under encipherment, he should not lose this software investment as a consequence of owning a computer using a crypto microprocessor. In fact, with today's powerful computers, he will probably want the ability to concurrently execute enciphered and nonenciphered programs. One approach to mixed mode execution would allow the same program to contain both enciphered and clear text instructions, implying the use of a program means to switch modes, as Chiu described in U.S. Pat. No. 4,633,388 (1986). This method is not suited for mixed support of independently developed programs, however.

A second method would support serial execution of either nonenciphered or enciphered programs, but not both modes concurrently such as the crypto microprocessor described in U.S. Pat. No. 4,573,119 to Westheimer et al (1986). The Westheimer device has a circuit which detects an operation code specifying lower and upper bound addresses of enciphered programs. The circuit responds by enabling two transform units which decipher the program's instruction codes and data addresses within the specified bounds, but a branch to a location outside the bounds would result in a fault.

Yet another method would allow multiple enciphered programs to be run concurrently with nonenciphered programs within a single environment but not allow mixing of enciphered and nonenciphered modes within one program (as in U.S. Pat. No. 5,034,980 to Kubota, 1991). In this approach, mode switching is performed by software after loading a mode register prior to the dispatch of a process. This method is the most flexible for multitasking systems.

In summary, there are three main approaches to software protection: diskette media copy protection, hardware dongle devices, and crypto microprocessors. While the crypto microprocessor offers the strongest form of protection, previous crypto microprocessor patents omitted some important capabilities. These include: user customization (to designate the target computer system); use of multiple cipher keys (to avoid the weakness of "known plaintext" attack); support of a protection mode for operation on a local area network; and mixed enciphered/nonenciphered code support of independently developed programs.

Table 2 compares support of features by these patents.

TABLE 2

| Crypto Processors: Comparison of Features | | | | |
| --- | --- | --- | --- | --- |
| Conceal Codes | Assign System | User Custom | Multi-Key | Network Support |
| Best | yes | yes | no | yes | no |
| Chandra | yes | yes | yes | yes | no |
| Chiu | yes | yes | no | no | no |
| Gaffney | yes | yes | no | yes | no |
| Kubota | yes | yes | no | no | no |
| Matyas | yes | yes | no | yes | no |
| Westhe/ | yes | yes | yes | no | no |

OBJECT OF THE INVENTION

Designed to prevent software piracy, the present invention comprises a method of enciphering computer programs, a method of customizing the programs by the user, an improved crypto processor, and a method of execution in a computer system incorporating this crypto processor. Accordingly, several objects and advantages of the present invention are:

1) Prevent a computer program from being executed on computer systems other than those authorized or licensed for said program.

2) Provide a network operating mode, allowing a single copy of a protected program to reside on a file server system, then loading executable copies to requesting workstations, with each workstation having its own cipher key.

3) Provide for user customization of programs, making it possible to mass distribute "shrink wrapped" protected software.

4) Remain compatible, insofar as possible, with current software production and distribution methods, and with the practices of computer users.

To achieve these and other objects, innovations are introduced by the present invention to overcome the shortcomings of the other approaches, including an improved crypto microprocessor which incorporates a re-encipherment translation means. The crypto functions are encapsulated so as to be essentially independent of computer architecture.

In the described embodiment, protected software is purchased and is customized by the user to execute only on one designated computer system or network. Each computer system incorporates a crypto microprocessor which deciphers the program according to a specific cipher key or algorithm. The crypto processor is a plug-in replacement device for the conventional microprocessor, and existing non-crypto systems may be easily and inexpensively converted.

The object of replacing chips in sockets of existing systems also means that the present invention is an extension of current computer instruction set architectures, rather than a totally new one. Thus, one may be able to buy replacement chips for the Intel iAPX86, Motorola 68 k, and other popular microcomputer families.

SUMMARY OF THE INVENTION

Improved Crypto Processor

A novel and useful feature of the present invention's crypto processor is its ability to re-encipher protected programs. That is, it translates a file enciphered under a first cipher to a form enciphered under a second cipher. It is this feature which lets the user designate the target computer system after he buys the software, rather than beforehand (as is required by other methods). The procedure in which a user's target computer is so designated, and his program files are translated to execute only on this computer, is referred to as user customization. Some prior crypto microprocessors were able to both decipher and encipher programs, and therefore could combine these two operations to produce a "re-enciphered" file. However, the method using two separate operations can reveal plain text information in a computer's main memory. In contrast, the present invention deciphers and enciphers as a single indivisible operation. Since intermediate results are kept within the crypto microprocessor chip, plain text cannot be accessed by the user. Thus a program may be translated from one cipher to a second cipher in the user's target computer system, at his own workplace, without compromising proprietary program codes.

A further benefit provided by the re-encipher operation is support of a network operation mode. In this mode, enciphered programs are maintained on a file server computer system, but are made available for loading over the network for execution on any eligible network-attached workstation. Since each workstation via its crypto microprocessor is assigned a unique cipher key for each program that may be requested, the re-encipher operation is used to translate from the server cipher key to the assigned workstation cipher key. Thus on a network with 100 workstations, only one copy of a program is stored rather than 100 copies with each program copy enciphered differently.

The re-encipher operation also enhances the crypto microprocessor's ability to render protected programs tamper-proof. The method employed is to encipher program files using the cipher block chaining (CBC) method, described by Federal Standard 1026, proposed by the U.S. General Services Administration. The last cipher block of the program is effectively a checksum of all preceding program blocks, providing a means for detecting file modification. The CBC checking will normally be incorporated into the operating system's program loading functions. As willful corruption of the program can always be detected by this means, most computer viruses cannot infect enciphered programs.

Software Development

Software developers who make use of the present invention will find that their work remains essentially unchanged. However, whenever a software product is ready for release, a developer will perform two additional steps:

1) Contact a remote EXCHANGE database system to transmit software product release information, including: software vendor identifier, product name and version, and number of product copies, either by serial number range or by enumeration. The EXCHANGE system will respond to this information by specifying a cipher key and cipher algorithm with which the software developer is to encipher the software product prior to duplication and distribution of copies.

2) Encipher a master copy of the software product under the cipher specified by the EXCHANGE system. This master copy will be used by the developer's duplication department or a service bureau as the source copy for duplication.

User Customization

A user who intends to obtain software protected under this invention must either have a computer system incorporating the described crypto microprocessor, or must upgrade his system by installing a crypto microprocessor in his system. After the user purchases a copy of the protected software, he installs it on his own system from the distribution media. This is common practice for almost all software now, and normally entails copying and/or decompressing programs from distribution media (e.g., magnetic diskettes or optical CD-ROM disk). However, a software product which is protected under the present invention requires that the user perform an extra step. The aforementioned remote EXCHANGE database system is contacted as a part of software installation. The user executes a customization program which prompts the user for input parameters. A control message is then transmitted to the EXCHANGE system. The EXCHANGE system sends a reply with data which enables the customization program to modify the programs to a form which may be loaded and executed on the target system.

BRIEF DESCRIPTION OF THE DRAWINGS

To further aid in understanding the invention, the attached drawings help illustrate specific features of the invention. The following is a brief description of the attached drawings.

FIG. 1 is an overview of the system; FIG. 1A shows the software vendor role, FIG. 1 B shows the computer user hardware requirements, FIG. 1C shows user installation and customization of protected software.

FIG. 2 shows user customization for single system mode.

FIG. 3 shows user customization for network server mode.

FIG. 4 shows user customization for site license mode.

FIG. 5 shows the layout of a customization control record (CCR) as sent by INSTALL to the EXCHANGE system.

FIG. 6 shows the layout of a customization control record (CCR) after it is returned by EXCHANGE to INSTALL.

FIG. 7 shows the layout of crypto control memory.

FIG. 8 shows the format of a Cryptix executable program file, together with its loaded process image.

FIG. 9 is a block diagram of the Cryptix dynamic library processing.

FIG. 10 is a block diagram of a crypto microprocessor.

FIG. 11 is a block diagram of a crypto translation unit.

FIG. 12 is a block diagram of the cipher key generator.

DETAILED DESCRIPTION OF THE INVENTION

Consideration of the following example, which is purely exemplary, further clarifies the use of the invention.

Enciphered programs are distributed in the same manner as unenciphered software, recorded onto magnetic, optical, or other media such as diskettes, tape cartridges, CD-ROMs, semiconductor memory cards, and etc. Programs may also be transferred over the switched public telephone network by modem, or over a digital data network. The fact that a program is protected under the present invention is transparent to a software user. That is, the program behaves in execution exactly the same as its unprotected version. However, the user is unable to share protected software freely with others, except as described later, since it is capable of execution on one and only one designated computer system.

Referring to FIG. 1-A, program files 10 created by a software developer are enciphered under a distribution cipher key 12 before being sent to a duplication facility 14.

The duplication may be done in-house or by a service bureau. In either case the program codes are safe from unauthorized disclosure. After duplication, the software distribution media 16 are packed with documentation and other materials, wrapped in a colorful package, and shipped to outlets for eventual sale.

FIG. 1-B illustrates the requirement that the user's computer system must incorporate a crypto processor 18 in order to execute protected software. A protected software package will not run on any system other than the designated target computer 20, and will not do so until a user customization procedure is executed.

User Customization

After a software package is purchased, the user must customize the software with an installation procedure before the protected programs can be executed on a designated target computer system. User customization (FIG. 1-C) is performed by running an INSTALL program which is normally provided on the distribution media 16.

To ensure that a purchased software package is installed onto a designated computer system and no other, the INSTALL program acts in cooperation with a remote EXCHANGE database system. The EXCHANGE database retains records on every software package protected under this invention, information provided by software vendors prior to them distributing the protected programs. In addition, the EXCHANGE database holds information describing crypto microprocessor parts distributed by hardware vendors.

Identifiers and Cipher Keys

Each crypto microprocessor part is fabricated with non-volatile read only memory (ROM) cells which permanently store a device identifier (DEVID) and a device cipher key (DEVKEY). A protected computer system is assembled using these microprocessor parts. The operating system provides a service so that programs may obtain the DEVID of any of its microprocessors.

A computer system based on crypto microprocessors has in addition a system identifier, or SYSID, and a system cipher key or SYSKEY. Support of crypto functions can be provided only by protected (enciphered) versions of the operating system (OS). After installation of the OS, but prior to installing and executing other protected software, the OS installer contacts the EXCHANGE network to request assignment of a system identifier (its SYSID) and a system cipher key (or SYSKEY) for the computer. The OS installer may be the computer system manufacturer (many of whom pre-install operating systems) or the end user. The SYSID will be used to identify the user's system in all future installations of protected software; the SYSKEY is used to encipher protected software during installation, and to decipher program files during program execution.

After the EXCHANGE has assigned the SYSID and SYSKEY, the operating system stores the SYSID on a disk file with filename CRYPTO.INI, and also records it into nonvolatile system memory. Either an EEPROM memory or a battery-backed CMOS memory chip may be used to store the SYSID. In the event that the SYSID is lost from the disk file where it was stored, it may be recovered from its nonvolatile memory location, or vice-versa. If a loss of the SYSID occurs in both memory chip and the disk file, the EXCHANGE software can restore it from a table look up of any of the DEVIDs. Note that the SYSID is normally not needed except when installing protected software; the SYSID is unrelated to the computer system manufacturer's serial number. Should a second protected operating system be installed, the installation program will check for the existence of a SYSID. The EXCHANGE need not be contacted if a SYSID already exists.

The CRYPTO.INI File

Three kinds of entries are held in CRYPTO.INI: the SYSID, the target system's DEVID(s), and the SYSIDs of eligible client systems if the target system is a network server. The term NETID is used to denote the SYSID of a client system, to distinguish it from the server SYSID.

The first entry of the CRYPTO.INI file contains the system identifier:

SYSID

For each crypto processor of a system, an entry is stored in the CRYPTO.INI file of the form DEVID (Ed(SYSKEY) )

where DEVID is the device identifier and Ed(SYSKEY) denotes the system cipher key enciphered under the device cipher key corresponding to DEVID. By referencing its own entry, each crypto processor has access to the SYSKEY.

NETID entries are stored in the form

NETID (Es(NETKEY) )

where NETID denotes the SYSID of an eligible network client computer system, and Es(NETKEY) denotes the SYSKEY of that client, enciphered under the network server system SYSKEY. NETID entries are created during assignment of a system's SYSID/SYSKEY; the EXCHANGE system provides the values for Es(NETKEY) from a list of NETID values sent by INSTALL.

The EXCHANGE Database

The EXCHANGE database comprises four main kinds of tables:

the (1) HARDWARE table and its child the (2) DEVICES table, and the (3) SOFTWARE table and its child the (4) PROGRAMS table.

The HARDWARE table is essentially a catalog listing of all crypto microprocessor types. The DEVICES table is more like an inventory file, enumerating every crypto processor part extant. The SOFTWARE table like the HARDWARE table, is analogous to a catalog, but of protected software products. The PROGRAMS table is an inventory of protected software program packages which have been shipped by distributors.

As noted, DEVICE records exist for all parts manufactured, each record containing the relation:

DEVICES (DEVID*, SYSID*, DEVKEY, SYSKEY), where DEVID and SYSID are marked with an asterisk * to indicate they are lookup keys. SYSID and SYSKEY are either empty (meaning the device is not yet assigned a system identifier), or have the values assigned by the EXCHANGE software during operating system installation.

Software developers licensed to protect their program products under this invention must provide the EXCHANGE database with an enumeration of every software package before they are distributed for sale. The data provided by the software developer comprises program name and program version; a list or range of serial numbers and associated user counts of each must also be specified, where the user count denotes allowed number of computers which may concurrently execute the program under terms of the license agreement.

The EXCHANGE database will then be extended by creating an entry in a SOFTWARE table of the form:

SOFTWARE (SID*, SNAME, DISTKEY)

where SID denotes the generic identifier for the software package (including version); the asterisk * indicates it is a table lookup key. The SNAME field contains the official product name, and DISTKEY is the distribution cipher key under which the program files are enciphered. A related set of entries will be inserted into a child table called PROGRAMS, each entry having the form:

PROGRAMS (PGMID*, COUNT, SYSID), where PGMID is marked by * to indicate it is a lookup key; it denotes the program identifier, a composite value made up of the SID (defined in the SOFTWARE table), and a serial number unique for each package shipped. The COUNT field is the user count or number of concurrent executions; it is usually 1 but may be greater than one if the package is installable on a network or is the master (site or corporate) license copy. The SYSID is a placeholder, since the software is as yet uninstalled. The EXCHANGE database reserves a physical location in each record of the PROGRAMS table for SYSID, as this field will eventually receive the system identifier of the target computer on which the program is installed.

Customization by INSTALL/RESPONSE

Installation of protected software is managed by an INSTALL process running on the target computer system in cooperation with a RESPONSE process on the EXCHANGE database system. INSTALL initiates the communication and transmits a customization control record (CCR) to the EXCHANGE:

CCR (ICODE, SYSID, COUNT, PGMID)

is sent to the EXCHANGE system to request user customization where ICODE=7 (denoting single system mode), SYSID is set to the target system identifier, PGMID is set to the product identifier of the subject software, and COUNT=1, as the target computer has only one processor. The EXCHANGE system receives this message, acknowledges it and passes the data to a RESPONSE process which performs a lookup of the PGMID in one of the PROGRAMS tables. Assuming PGMID is found, the data record is read:

(PGMID, PGMKEY, COUNT, SYSID).

If the record SYSID field is empty, RESPONSE process compares the record COUNT field with that of the INSTALL message COUNT value. If the latter is not larger than the former value, the INSTALL COUNT is used to replace the record COUNT and the INSTALL SYSID is moved into the record SYSID field. The RESPOND process then reads the DEVICES table to obtain the SYSKEY value for this SYSID. This SYSKEY is used to encipher PGMKEY. RESPOND then formats the message:

CCR (RCODE, SYSID, COUNT, PGMID, Es(PGMKEY))

where Es(PGMKEY) denotes the PGMKEY enciphered under SYSKEY. This message is returned to the INSTALL process.

The table below lists the values and descriptions for the ICODE and RCODE parameters:

| CODE | DESCRIPTION |
|---|---|
| 1 | Acknowledgment |
| 2 | Error |
| 3 | Terminator |
| 4 | Delimiter |
| 5 | Data Record |
| 6 | Initial (SYSID/SYSKEY) Request |
| 7 | Single System Request |
| 8 | Network Server Request |
| 9 | Site License Request |
| 10 | NETID List |
| 11 | NETKEY List |

Protected software is customized in one of three basic modes: single system, network server, or site license, depending on the system where the files reside (repository system) and also depending on the designated system or systems on which the programs may run (execution system). In single system mode, the files reside on the same system whereon the program executes. In network server mode, the program files reside on a server system and are executed on network-attached workstations. In site license mode, the program files are installed on and reside on a primary repository system. These files are then duplicated onto removable media as archive or backup copies; the media are removed from the repository system and are manually transported to and restored onto secondary computer systems. The secondary systems are also eligible to execute the programs. The number of such systems may be limited by a maximum licensed user count.

FIG. 2 shows the user customization procedure. INSTALL first reads a customization control record (CCR) from a diskette 16. The system identifier (SYSID) of the target computer 20 is then obtained from an operating system service; the SYSID is moved into the CCR. Under control of the INSTALL program, target computer 20 then contacts the remote EXCHANGE database System 24, which returns the updated CCR with data obtained from table lookups using the PGMID and SYSID.

In network server mode (shown by FIG. 3), the INSTALL procedure is very much like single system mode. However, the COUNT value in the CCR message sent to the EXCHANGE may be greater than the number of processors in the repository or server computer, so that network-attached client systems are eligible to load and execute the subject protected programs in site license mode (shown by FIG. 4), wherein the software is stored on a primary repository computer, archive or backup copies may be prepared on removable media for restoring on other eligible computer systems. Each archive copy so created causes the site user count to be incremented by one. The INSTALL program logs the creation of each copy and will not allow copies to exceed the maximum user count, as specified by the terms of the site license. The archive files are restored under control of an INSTALL program on the receiving system, which customizes the software for its SYSID.

Hardware Upgrades

Protected software is customized for execution on designated repository and execution systems; however, the user should be able to continue using such customized software after upgrading his computer system hardware. To accommodate processor chip or system board replacement (or a complete system upgrade), the UPGRADE program allows the user to re-customize software by specifying appropriate options. For example, if a processor chip or system board is replaced in a computer with software customized for single system mode, the user executes the UPGRADE program. UPGRADE will make a copy of the CRYPTO.INI file, naming the copy CRYPTO.NEW. UPGRADE then displays a dialogue box asking the user to specify his new configuration.

If one or more microprocessors are to be removed or replaced, the DEVID of each device are deleted from the CRYPTO.NEW file. For each replacement microprocessor, and any microprocessors that are added to the system, UPGRADE inserts the DEVIDs into the CRYPTO.NEW file. This done, UPGRADE then contacts the EXCHANGE system and requests appropriate upgrade data, which comprises DEVID/Ed(SYSKEY) entries for each client processor upgraded, and NETID/Es(NETKEY) entries for each server processor upgraded. If the EXCHANGE returns this data without error, the CRYPTO. NEW file is updated. After the hardware change is complete and the upgraded system is powered up, the operator specifies CRYPTO.NEW as the alternate crypto control file.

Programming Model

Crypto microprocessors fabricated according to the present invention are capable of concurrently executing both enciphered and non-enciphered programs. In a uniprocessor system, only one task or process may execute at any instant, and is referred to as the active process. Multitasking operating system software maintains an inventory, usually called a ready list, of processes eligible for execution. To efficiently handle program decipherment in multitasking and interrupt processing environments, a described embodiment of the crypto microprocessor employs protection zones, numbered 0 to N. An area in protected memory containing structures called zone management records are used to control decipherment of up to N programs concurrently. Each enciphered program on a system's ready list is assigned to a protection zone, where the zone is identified by a number. By convention, normal unenciphered programs are assigned to zone 0, enciphered programs are assigned to zones 2 through N, and in the special case of interrupt handling routines, zone 1 controls decipherment: A zone can be assigned to more than one process, if the zone management record contents are saved whenever a process is suspended, and are then restored before the process is resumed.

Crypto Function Calls

Below are the crypto functions which together provide a programmatic interface to crypto services. All functions require that their callers execute in privileged mode (also called kernel mode). Crypto functions are implemented as an extension of the host computer instruction set. These functions, together with crypto execution mode, contain the necessary functionality to fully implement all the features of a crypto microprocessor.

| Function | Mnemonic | Description |
|---|---|---|
| 1 | INIT | Initialize crypto mode |
| 2 | READ | Read zone management record |
| 3 | SAVE | Save zone management record |
| 4 | OPEN | Open specified zone |
| 5 | LOAD | Load crypto status register |
| 6 | STOR | Store crypto status register |
| 7 | INFO | Get system/device identifiers |
| 8 | CONV | Convert (recipher) a code block |

It should be understood that the mnemonic words used for the crypto function calls (INIT, READ, etc.) are exemplary only. In actual use the words would be replaced by character strings that do not conflict with reserved words of the operating system programming language.

The INIT crypto function initializes four data items in crypto control memory, the DEVID, DEVKEY, SYSID, and SYSKEY. DEVID and DEVKEY values are shifted from noncontiguous read-only memory (ROM) cells into their respective registers. The ROM cells reside on the crypto processor chip as does the crypto control memory area. Note that the DEVID and DEVKEY registers are cleared during system RESET. The SYSID and SYSKEY values, unlike DEVID and DEVKEY, are not initialized from device ROM, but instead are taken from main storage locations pointed to by the INIT call parameter list. Operating system software is responsible for reading the two values from external storage and placing them into main memory. The SYSKEY parameter is enciphered under DEVKEY while in main memory; it is deciphered before loading into the SYSKEY register of crypto control memory.

The apparent redundancy of having a RAM DEVKEY register which is initialized from ROM cells is an important security feature: had the DEVKEY been made a permanent ROM register instead, it would be more vulnerable to disclosure, using techniques such as scanning the chip with an electron microscope. A perpetrator will have much more difficulty cracking the secrets of a chip in which a (cipher key) register value disappears upon being powered down.

An operating system routine calls the INIT crypto function prior to launching the first enciphered programs. An enciphered program may not be assigned to a protection zone before the INIT crypto function is activated without causing a program fault. Operating system code executed after the first INIT call should be enciphered.

The SAVE crypto function is used by operating system routines to transfer a main memory image of a zone management record to its appropriate zone table entry within crypto control memory. The SAVE function is used to initialize a zone management record prior to launching programs assigned to its zone. The READ crypto function is used to transfer a zone management record from its crypto control memory entry to a specified main memory location. The contents of a record remain unchanged in crypto control memory.

The OPEN crypto function activates a zone, allowing decipherment of programs assigned to it. A program assigned to a zone which has not been OPENed will result in a fault condition when the program is launched.

The LOAD crypto function transfers the contents of the specified crypto status register from a main memory location. The STOR function transfers it back into a main memory location. Typical uses of STOR and LOAD by operating system routines are to retrieve, modify, and then transfer a register contents back into crypto control memory.

The INFO crypto function is used when the SYSID is required, such as during install of protected software. As explained under the section on user customization, the SYSID is used as a table look-up key by EXCHANGE software to obtain the processor's SYSKEY. The SYSKEY enciphers data required by user customization.

The CONV crypto function is used o re-encipher a block of data. That is, the data block is deciphered under one cipher key and then enciphered under a second cipher key. It has two modes of operation: CBC mode, which converts the data block by using the Cipher Block Chaining (CBC) algorithm, and XOR mode, which converts using the simple exclusive-OR (XOR) operation. CBC and XOR encipherment are discussed under Cipher Methods, supra. The modes may be mixed in a given call to CONV: the input block may be translated in either CBC or XOR mode, then translated to an output block using either mode.

CONV uses a pair of 256-bit cipher keys, one for the input (decipher) operation, and a second key for the output or encipher operation. The two cipher keys are passed to CONV in a parameter list. The key parameters in memory are enciphered under the SYSKEY to protect against possible disclosure. The CONV function parameter list has the following layout:

Parameter 1 (4 bytes): address of input buffer

Parameter 2 (4 bytes): address of output buffer

Parameter 3 (4 bytes): length of buffers

Parameter 4 (4 bytes): initial virtual address

Parameter 5 (32 bytes): enciphered input base key

Parameter 6 (32 bytes): enciphered output base key

The internal circuits for implementing crypto function calls are not specified, on the premise that each processor type will use an appropriate means. In some computer architectures the crypto functions may be microcoded instructions. In others they may be ROM-resident program procedures in a processor's standard instructions. If the latter means is used, it is important that these functions execute within an exclusive memory space so that they can only be invoked via the crypto call interface. Crypto functions implemented in this way should be stored as enciphered code, to discourage "reverse engineering" the chip design.

Crypto Control Memory

FIG. 7 shows the layout of Crypto Control Memory. Located completely within the crypto microprocessor chip itself, this area cannot be accessed by processes executing in main memory, including operating system routines. Its address space is local to the crypto translation unit logic and to the callable crypto functions.

Crypto Status Word 0 is a 32-bit structure containing data items which are initialized by operating system software by means of the INIT crypto function call. The high order eight bits (bits 31–24) comprise the Program Zone Selector, which specifies the Zone Management Record controlling decipherment of the active program. Closely related to this is the Interrupt Zone Selector, an eight bit value (bits 23–16 of CSW 0) which denotes the Zone Management Record controlling decipherment of interrupt routines. The Crypto Disable signal (controlled by bit 7 of CSW 0) globally disables crypto functions if reset, enables them when set. Bits 6–4 encode the Crypto Delay Size; this specifies the number of instruction blocks which will be executed without decipherment after an interrupt occurs. The Crypto Page Size is set into CSW 0 bits 3–0; this is the size in bytes of a memory page that will be deciphered under one cipher base key. When the Crypto Translation Unit detects that a page boundary has been traversed, it generates a new cipher base key, which is described in more detail, supra.

Crypto Status Word 1 is a pointer to the Zone Records Semaphore; it is used to control concurrent access to the zone management records table in Crypto Control Memory.

Crypto Status Word 2 is a pointer to the Conversion Workarea Semaphore. It is used to control concurrent access to the data conversion workarea table in Crypto Control Memory. These work areas are used by the CONV Crypto Function Call, described in the previous section.

Crypto Status Word 3 is the Crypto Functions Vector Table. This is a table of entrypoint addresses used by processor chip logic to access crypto function calls.

The DEVID field is a 64-bit structure used to identify a microprocessor device. The high-order 32 bits conform to the device identifier code specified in the boundary scan interface described by IEEE Standard 1149-1-1990. The low-order 32 bits are a serial number of the individual part. No two parts having the same device code may use the same serial number. Note that a very useful extension of the bound scan functions could be used to deter theft of both microprocessor chips and systems constructed from them: if the built-in self test (BIST) which runs at power up or reset is extended to include loading program registers with the device identifier code and serial number, these values could be displayed whenever the operating system is re-booted. A prospective purchaser could check the values to determine whether they were among any reported as stolen, and take an appropriate action according to the result of the check. If the microprocessor chip had not yet been incorporated into a computer system, it could also be checked by means of a test access port readout to see if the chip was stolen property.

The DEVKEY is a 128-bit cipher key used by operating system software to encipher parameters during user customization of protected programs; this cipher key is also used subsequently by operating system routines for loading the programs for execution.

The crypto microprocessor performs special handling for architectures using interrupts. An interrupt provides a means for switching the processing context, replacing the program counter with a new value after saving its previous contents. Whenever an interrupt occurs, the processor saves the current program counter on the stack (or local memory where the processor has no stack), then loads a new program counter value to begin executing a program code to handle the specific interrupt cause, usually changing to privileged mode. An interrupt occurs whenever certain instructions are executed, or if certain bus control signals are activated by external hardware. Because interrupts may occur thousands of times per second in the course of normal processing, no delay must be introduced by crypto circuitry in switching from decipherment of normal program code, to that of interrupt handling routines. This performance requirement is met by an immediate switch to an alternate protection zone when the Crypto Translation Unit detects that an interrupt is in progress, and is explained in greater detail, supra. The same performance criteria are met in the switch back to the interrupted program, after the interrupt has been serviced.

Operating System Support

A programming interface using a set of callable crypto functions is provided to support loading and execution of protected programs. The crypto functions serve to isolate system software from underlying hardware implementations, allowing for future extensions without creating incompatibilities. Protected programs must be launched with the assistance of the operating system, since only privileged programs may execute the crypto functions.

Operating system support on crypto microprocessors is discussed below using as an example the Cryptix operating system, a version of System V UNIX having extensions for enciphered program files. The present invention supports other operating systems such as MS-DOS, WINDOWS, UNIX and others by extending these operating systems using the following described techniques as examples.

Launching Programs

A program file is an executable file residing on a disk volume. Cryptix reads a program file into memory and then executes it by means of the exec system call. An executing instance of a program is called a process. The program file is loaded by exec into memory in a form referred to as the process image.

FIG. 8 shows a program file disk structure 810 with its process image 830 after the exec function has read it into main memory. This information is based on the UNIX System V Common Executable File Format (COFF) definition. Cryptix files, like those of standard UNIX, begin with a file header 812. This structure holds a data item ($f_{13}$flags) which indicates whether or not the file is executable.

Following the file header is an auxiliary header 814 which contains information used by the UNIX exec system call to load the file into memory. The auxiliary header found in Cryptix executable file formats is compatible with the standard COFF but has definitions used by the system to support enciphered program files. For clarity, item names here may depart from standard UNIX names.

| AUXILIARY HEADER STRUCTURE | | |
| --- | --- | --- |
| magic | SHORT | Runtime object format. |
| vstamp | SHORT | Optional version stamp. |
| tsize | LONG | Size of machine code in bytes. |
| dsize | LONG | Size of initialized data in bytes. |
| bsize | LONG | Size of uninitialized data in bytes. |
| entry | LONG | Program entry point address. |
| txt_base | LONG | Runtime base of program code. |
| dat_base | LONG | Runtime base of program data. |
| bss_base | LONG | Runtime base of uninitialized data. |

The first auxiliary header item, with the whimsical name magic, denotes the object format of the file. Four values are defined for unenciphered program formats:

| | | |
|---|---|---|
| OMAGIC | 407 | Impure; text segment is writable. |
| NMAGIC | 410 | Shared; write protected text segment. |
| ZMAGIC | 413 | Special format used for demand loading. |
| LIBMAGIC | 443 | Shared library of same format as ZMAGIC. |

Cryptix defines and supports the four enciphered versions of these formats:

| | | |
|---|---|---|
| OCRYPTIC | 607 | Enciphered OMAGIC format file. |
| NCRYPTIC | 610 | Enciphered NMAGIC format file. |
| ZCRYPTIC | 613 | Enciphered ZMAGIC format file. |
| LIBCRYPTIC | 643 | Enciphered LIBMAGIC format file. |

Existing non-crypto UNIX systems will not attempt to load protected programs having these new magic identifiers but instead will return an error.

Again referring to FIG. 8, a variable number of section headers 816 follow the auxiliary header 814. Each section header describes one of the sections contained in the program file. Of the twenty or more section types, program files usually contain only a few, the most common being the .text, .data, and .bss sections. exec reads these sections into memory, loading corresponding text region 834 and data region 836 into the process image 830.

Cryptix adds one new section type, denoted by the name ".key". The key section 822 holds a cipher key table for an associated text section 820. The cipher key table is a set of initial or seed values used to generate working cipher keys during execution of enciphered code. If a cipher key table is present, a .key header must be the first section header in the file, since its contents are needed to load subsequent program text.

As an example, suppose the exec system call is invoked by an executing process. The caller passes two parameters, returning an INT result:

errcode=exec( filename, args);

where filename denotes a pointer to a character array that is initialized with the name of the enciphered file, args denotes a pointer to a string of zero or more command-line program arguments, and errcode is the INT type result.

exec first reads the file header into memory. If the f_flags item has value F_EXEC set on (0002 hexadecimal), this denotes the subject file is executable. exec saves the f_flags information, then reads the auxiliary header 814 into memory.

The magic item in the auxiliary header is checked; if it has one of the values (407, 410, 413, 443), exec recognizes this is an unenciphered file and branches to the normal program load logic. On the other hand, if magic is one of the values (607, 610, 613, 643), the kernel routine which handles enciphered program loading receives control. Any other value for magic results in an error, returning a non-zero result (errcode) to the caller.

Suppose the magic item was ZCRYPTIC 613): This value indicates exec must call the CONV crypto function to re-encipher the program code in addition to normal text loading. If this is the case, exec reads the first section header following the auxiliary file header, which must describe a .key section.

The .key section header has several items used to manage the loading of enciphered program files:

| | | |
|---|---|---|
| s_name | CHAR | Section name (".key"). |
| s_paddr | LONG | Physical address of cipher key table. |
| s_vaddr | LONG | Virtual address of cipher key table. |
| s_size | LONG | Section size in bytes. |
| s_scriptr | LONG | File pointer to cipher key table. |

If s_name is not equal to ".key", exec returns an error to its caller. If equal to ".key", exec allocates an area to store the cipher key table (using s_size plus an allowance for any dynamic library routines to be loaded). A parameter list to call the CONV crypto function is then built. As each text block is read into storage, exec updates the parameters as required and calls CONV to re-encipher the program text. CONV is called with parameters indicating CBC decipherment and XOR encipherment, with dynamic key generation.

Before the program is launched, a protection zone is assigned to it by calling the OPEN crypto function. This initializes the assigned zone management record with the starting cipher key and the program base address. Crypto mode will be enabled by the system process dispatcher upon activating the program, to allow decipherment of the executing program. This is done by resetting bit 31 of Crypto Status Word 0.

Shared Libraries

Cryptix also supports dynamic calls to shared library procedures, wherein the library is either unenciphered, or is enciphered under a different cipher key than the calling program. As in standard UNIX systems, host library procedures are bound with the calling program, resulting in .lib sections and .init sections in the executable file. The code in the host procedures generate a system call (dynex), which acts to mediate a dynamic linkage to a shared target library procedure.

FIG. 9 diagrams Cryptix dynamic library processing. A target library file has a magic code of LIBMAGIC (443) for Unenciphered text, or LIBCRYPTIC (643) for enciphered text. If the library file has not been loaded, dynex allocates a library text region 933 aligned on the next even multiple of 1 MB after the program text region 834, and loads the library text section 920 into it. If the target library is enciphered, this allows dynex to set the target library cipher key(s) into the next sequential location in the calling programs cipher key table; dynex will request the CONV function to re-encipher the library text, making it a seamless continuation of the calling program so that it executes under the same protection zone.

However, if either the library file is enciphered and the calling program is not, or vice-versa, the library text cannot execute under the same protection zone as the calling program. For this reason, dynex sets up a zone-switching mechanism. In cases where both calling program and library procedure are enciphered, or where both are unenciphered, dynex resolves the call reference directly: i.e., the calling program loads the procedure address in the fixed-up code. In cases where the calling program is enciphered and the target library is unenciphered, or vice-versa, dynex fixes up calling program code so that a system call (to dynex) is made to mediate the linkage each time. On each such call, dynex saves the current zone identifier and switches to a new one, allocating and initializing a zone management record to control execution of the library procedure. On return to the caller, another dynex call is made to de-allocate the zone management record and set the zone identifier to that of the caller.

Protected Driver Program

Before protected software may be installed on a computer system, the system must (1) be fitted with a crypto microprocessor, (2) be assigned a system identifier or SYSID by the EXCHANGE system, and (3) have a protected driver program.

The protected driver is needed because all but one of the crypto functions (the INIT call) can be called only from enciphered code. The functions are further restricted by the fact that calling programs must also run in privileged mode. The user customization procedures accompanying the INSTALL program for protected software, do not execute as privileged code. Hence, a privileged interface to the crypto functions is needed, in the form of an installable driver.

The "installable" attribute means the driver is loaded by the operating system as a memory-resident routine, but is not directly callable by user application programs. Instead a calling program may only access the driver by means of a software interrupt instruction, which causes a mode switch to privileged execution. On return to the caller, execution mode switches back to non-privileged. The protected driver program is enciphered by the EXCHANGE using a cipher key unique to the target system; the program file is downloaded on the occasion of its the initial contact with the EXCHANGE to obtain a SYSID.

Cipher Methods

Cryptographers have long known that simple ciphers such as substitution or modulo-2 addition can be as secure as more complex techniques, provided that a sufficiently long non-periodic random cipher key is used. To be perfectly secure, a key must not contain any repeating characters or be used to encipher another message. A cipher using such a key stream is called a one-time pad. These are the only ciphers that achieve perfect secrecy, and were in fact used by the Soviet KGB organization. The method originated in 1917, when Gilbert Vernam devised a cipher based on the Baudot alphabet of the AT&T teletypewriter. In a Vernam cipher, letting M=m1 m2 ... denote a plaintext bit stream and K=k1 k2 ... a key bit stream, the generated ciphertext bit stream=C=Ek(M)=c1 c2 ..., where $c_i=(m_i+k_i) \mod 2$, $i=1,2,\ldots$.

This cipher is implemented in a microprocessor using the "exclusive-or" operation, where any ciphertext bit $c_i$=XOR $(m_i, k_i)$. The cipher is reversible: $m_i$=XOR$(c_i, k_i)$.

EXAMPLE:

If plaintext character A (01000001 in ASCII) is added modulo-2 to the key character R (01010010 in ASCII), the result is:

| M = 0 1 0 0 0 0 0 1 | (unenciphered character "A") |
| K = 0 1 0 1 0 0 1 0 | (key character "R") |
| C = 0 0 0 1 0 0 1 1 | (enciphered character "A"). |

The one-time pad is the model used for the described embodiment of this invention for a crypto microprocessor. If unenciphered program text is divided into multiple blocks and a different key is generated for each block, the large key size requirement is satisfied. Our problem is reduced to the task of designing a generator of random non-repeating key blocks.

Encipherment during Software Production

Protected programs are distributed as files enciphered under a set of keys stored within the program file, in an array referred to as the cipher key table. The cipher key table is itself enciphered under a 128-bit distribution key, the PGMKEY. The PGMKEY is stored in the SOFTWARE table entry for the subject program, within the EXCHANGE database. The instruction text portion of program files are enciphered under a cipher having the properties:

$E_k(B)=B$ where $k=0$, $E_k(B) \ne B$ where $k \ne 0$, where $E_k(B)$ denotes the encipherment of plaintext data block B under the cipher key k. A function which satisfies these properties is modulo-2 addition, implemented on computers as the exclusive-OR (XOR) operation.

Although any function satisfying the aforementioned properties could be used, the example here employs XOR. The XOR operation is combined with cipher block chaining (CBC) to protect against modification of the file, as defined by proposed Federal Standard 1026.

Encipherment during User Customization

User customization re-enciphers the protected programs under a transformed set of keys. The transform consists of applying the Data Encryption Standard (DES) algorithm using 56-bit keys extracted from the DEVKEY of the installing crypto processor. If KL is used to denote the low-order 56 bits of DEVKEY, KH denotes the high-order 56 bits of DEVKEY, and Bn denotes an arbitrary block of the cipher key table, transform T is calculated as:

T1=DES(KL,Bn)

T2=DES(KH,T1)

T=DES(KL,T2)

The transformed cipher key table is then enciphered under SYSKEY using the same procedure, substituting SYSKEY for DEVKEY in the expressions. Note that the DES algorithm is used as a non-linear transform under the DEVKEY, whereas encipherment under the SYSKEY is done for concealment. The instruction text section of the program file is enciphered using exclusive-OR operations on each block with cipher block chaining (CBC) to protect against modification.

Encipherment during Program Launch

Operating system functions which are used to launch protected programs must re-encipher the programs. Both decipherment and encipherment are under the SYSKEY, but use different algorithms. The program code is deciphered from XOR/CBC and then enciphered under XOR without CBC, since program execution requires random access. While in main memory the program code no longer needs the CBC protection; memory management facilities suffice.

Thus it is seen that programs protected under the present invention are enciphered at three different times: (1) prior to distribution, (2) during user customization, and (3) during program launching.

Program execution makes use of one kind of cipher algorithm, while program storage under distribution and user customization ciphers use another kind. Each of these cipher techniques is chosen as the optimal one for its special purpose, but the ultimate object is to prevent disclosure or misuse of protected software.

The method used to encipher distribution and user repository files is modulo-2 addition with cipher block chaining (CBC), which is similar to the well-known cipher feedback mode. A new cipher key is generated by the CBC technique by combining the current block key with the last enciphered data block. The CBC method reduces vulnerability to cryptographic attack because the original cipher key is diffused throughout the cipher text. CBC algorithms also generate check sums which can be used to verify whether the file has been modified. The Vernam cipher described earlier used a bitwise XOR operation; however, since the CBC method enciphers blocks of data, the ith plaintext block Mi is enciphered as $C_i$=XOR((XOR($M_i$, K)), $C_{i-1}$)

where initial ciphertext block Co=XOR(Mo, K); K is the cipher block key. Deciphering is done by computing Mi=XOR((XOR(Ci, Ci−1)),K) for i>0.

While distribution and repository ciphers benefit from the cipher block chaining technique, CBC cannot be used as a cipher for program execution. Because an executing process accesses its instructions randomly rather than sequentially, decipherment of a block must not depend on the contents of a prior block. For this reason, our execution cipher uses modulo-2 addition without chaining.

Crypto Translation Unit

FIG. 10 is a diagram of a crypto microprocessor constructed according to the present invention. For illustrative purposes, the described embodiment uses a conventional Intel486™ microprocessor with the addition of a crypto translation unit 1008, connected to the primary on-chip instruction cache unit 1010. A 32-bit linear address bus 1046 connects a segmentation unit 1022, a paging unit 1024 and a cache unit 1010. A 20-bit physical address bus 1045 connects paging unit 1024 to cache unit 1010.

During program execution, the microprocessor execution unit 1020 generates requests for instruction fetches as well as data operand accesses to main memory. These memory read requests are in the form of segmented addresses, which are expressed as the implied sum of a segment register value and an offset value. Segmentation unit 1022 translates the segmented address into a linear address, which expresses a location encoded as a 32-bit integer value. This value is also referred to as the virtual address or logical address. If paging mode is enabled in the microprocessor, linear addresses are mapped to physical addresses by means of tables held in unmapped memory. Paging unit 1024 performs the translation to physical address, either by a table lookup or by referring to a translation lookaside buffer (TLB) 1026, which holds a set of the most recently translated addresses. While this mapping and translation of linear to physical pages is complex, it allows storage of data and instructions in non-contiguous physical locations.

After an instruction fetch generates a segmented address, the address is translated to a linear value, and the paging unit uses two levels of tables to translate the linear address into a physical address. The first table level is the page directory, which is a 4 k-byte table of 32-bit entries. Each directory entry holds a 20-bit page number which specifies a 4 k-byte second level page table containing 32-bit entries which point to physical page frames. The hardware paging mechanism indexes into a page table during address translation using the linear (logical) address as a lookup argument. The result is the high-order 20 bits of the physical address. The low-order 12 bits are the same for both logical and physical addresses.

To compensate for the performance penalties incurred in both address translation and fetching data and instructions from main memory, the microprocessor stores frequently used logical/physical address pairs in the on-chip translation lookaside buffer (TLB) 1026 and stores frequently accessed data and instructions in the on-chip 8-KB unified cache buffer 1012.

In most cases the page-mapped address is resolved by an entry in the translation lookaside buffer or TLB 1026, which translates the logical address to a physical memory address.

Paging unit 1024 transfers the high-order 20 bits of the physical address (referred to as the physical tag) to on-chip cache unit 1010 via physical address bus 1045; the low order 12 bits of the address are obtained from linear address bus 1046.

An instruction fetch is always requested from cacheable memory. The linear (logical) address and the 20-bit physical tag are latched into cache unit 1010 during a memory read. The instruction will be supplied from the cache if a cache hit occurs on the read address (the physical tag plus the page offset). Any instruction bytes read from the on-chip cache are in unenciphered form, having been deciphered when the cache line was first filled from external memory. If the address is not in the cache, a cache line fill request is signaled to bus interface unit (BIU) 1002 with read address on internal address bus 1032. The BIU complies by driving the external bus with an instruction read bus transaction.

External logic decodes the control and address signals, enabling main memory to respond with code (instructions) in 32-bit blocks. The BIU 1002 transfers the code blocks via internal code bus 1033 to crypto translation unit (CTU) 1008 where they are assembled into 128-bit cache lines.

Signals internal to the CTU indicate whether the code blocks fetched are enciphered. If a cache line is not enciphered it passes unchanged from the CTU to cache unit 1010 where a cache line is filled. The instruction bytes requested (that initiated the cache fill) are then moved over code bus 1036 to prefetch unit 1004. The prefetch unit has a 32-byte queue which actually comprises two 16-byte lines of code; while one line is in use the prefetch unit fills the other line.

FIG. 11 is a diagram of the Crypto Translation Unit, which is the heart of this invention. A common clock signal and a common data bus (neither shown) are shared among the functional blocks of the CTU. An instruction translation cycle is initiated by the assertion of the code-available signal 1142 from bus interface unit 1002 (of FIG. 10). This signal is presented to both decipher logic 1106 and crypto key generator 1110. The cipher key generator 1110 then loads a sequence of input terms from the zone management record in control of the currently-executing process. If signal interrupt-in-progress 1132 is active, the interrupt zone management record provides the input terms. If the signal 1132 is inactive the program zone management record controls decipherment, and its input terms are used.

Referring again to FIG. 11, when an interrupt handling routine is active (i.e., interrupt-in-progress signal 1132 is asserted), multiplexor 1112 passes the interrupt zone byte 1124 (from CSW 0 of FIG. 7) to address decoder 1114, selecting interrupt zone record 1118 in zone control RAM 1116. On the other hand, if the interrupt-in-progress line 1132 is inactive, this indicates that a normal (non-interrupt) program is executing, and multiplexor 1112 passes program zone byte 1122 (from CSW 0 of FIG. 7) to decoder 1114 instead. Decoder 1114 uses the low-order 6 bits of the zone selector (either 1124 or 1122) to address of one of the zone management record structures within zone control RAM 1116 (i.e. interrupt zone record 1118 or program zone record 1120). Cipher key generator 1110 loads the data words from the selected zone record, using each word as an input term to generate active cipher key 1104. After key generation is complete, cipher key generator 1110 asserts signal key-available 1140. Coincident with the signal code-available, (which started the cycle), key-available causes decipher logic 1108 to decipher the instruction line. The decipher logic block contains a modulo-2 adder (exclusive-OR operation). The translation cycle completes when assertion of text-available 1144 signals that deciphered code is available to the instruction decode stage.

Two other signals may be present as outputs from multiplexor 1112: zone-disable 1136 and zone-delay 1138 these are passed through directly to cipher key generator 1110 rather than going to address decoder 1114. The two signals are controlled programmatically by operating system software according to the two high order bits of interrupt zone byte 1124 and program zone byte 1122 (in Crypto Status Word 0). If zone-disable signal 1136 is asserted during generation of a cipher key, the cipher key generator 1110 sets active cipher key 1104 to zeros, bypassing access of zone control RAM 1116. If signal zone-delay 1138 is asserted during generation of a cipher key, the cipher key generator 1110 sets active cipher key 1104 to zeros for the duration of Di instruction lines, where Di is a value encoded in bits 4–6 of Crypto Status Word 0. Zone control RAM 1116 is not accessed by the cipher key generator 1110 after zone-delay 1138 is detected, and the signal is reset at the end of Di instruction lines. In either case when active cipher key 1104 is set to zeros, the signal key-available 1140 is asserted.

The signal crypto-disable 1134 is controlled by setting bit 7 of Crypto Status Register 0. Whereas signal zone-disable 1136 disables decipherment only for the currently executing task, the crypto-disable signal 1134 disables crypto functions for the entire system. If crypto-disable 634 is made inactive by reset of bit 7 of Crypto Status Register 0, cipher key generator 1110 loads active cipher key 1104 with zeros during key generation cycles, acting to globally disable all crypto functions, including that of instruction decipherment. If bit 7 of Crypto Status Register 0 is set, normal crypto operations resume.

Cipher Key Generator

The described embodiment employs a multi-stage cipher key generator. The design requires a complex computation to be performed periodically, but this overhead is interleaved with other operations to improve performance.

Because the cipher method is reversible, a key generated for deciphering program code must be the same as was used for enciphering. To simplify key generation, the executable code portion of a protected program is divided into logical base segments of 1 MB size. Since it is likely the program is not an exact multiple of 1 MB, the last base segment may be short. Each base segment is denoted by a relative number 0, 1, 2, . . . and has an associated 128-bit "seed" or base key referred to as BASEKEY 0, BASEKEY 1, and so on. The BASEKEY n values are stored as an enciphered array in the program file, and this array is loaded into memory when the program is to be executed.

Each 1-MB program base segment is further divided into 512 2-KB pages. Each page is associated with its own page cipher key. Whereas the base keys are stored on disk and loaded into memory when the program is executed, page keys are computed by the cipher key generator as required, using the base key of the current base segment as a seed value. The base number Bn is used as an input term for the page key computation. Page keys are 128 bits long; however, page keys are not used directly for deciphering code. Each page key is used to compute up to 128 line keys, a line being the unit of decipherment in this example, 16 bytes. A line key is used only once; a new line key is computed for each 16-byte instruction line.

Since the base number Bn, page number Pn, and line number Ln are input terms used by the key generation algorithm, the crypto translation unit must obtain their current values before initiating a key generation cycle.

FIG. 12-A is a diagram of a 32-bit digital address with base number, page number, and line number. The base number is encoded in address bits 29–20 (10 bits), allowing for programs as large as 1024 MB. The page number is encoded in address bits 19–11 (9 bits) permitting 512 2 KB pages per base segment. The line number is encoded in address bits 10–4 (7 bits), giving 128 lines (16 bytes each) per 2 KB page.

Referring to FIG. 12-B, a key generation cycle is initiated by activating the code-available signal 1142. If signal crypto-disable 1134 is active, the operating system has globally disabled crypto execution mode. If signal zone-disable 1136 is active, the operating system has disabled crypto execution mode for the active protection zone. In either case the cipher key generator simply clears the active cipher key 1104 and activates signal key-available 1140. Otherwise, the code-available signal initiates generation of a new line key.

Assume a program has been launched under a protection zone and the operating system has called the OPEN crypto function on its behalf. The OPEN function moves program protection parameters (base key 1202, line tag 1206) into the assigned zone management record. Because the page key 1204 has not been generated for this program, the line number and page number in the line tag were both cleared to zeros. This forces re-generation of the page key as well as the line key.

After the zone becomes active, the cipher key generator sequencing logic 1214 is signaled via code-available when an enciphered line 1102 is loaded from cache unit 1010 (FIG. 10). The line tag of this enciphered line is simultaneously loaded into new tag register 1208. Tag comparator 1214 compares the values of base number and page number in new tag register 1208 and line tag 1206. If the base numbers differ, signal base-mod is activated. If the page numbers differ, signal page-rood is activated.

If the compare caused base-mod to be activated, an interrupt is generated, and a code value is placed on the interrupt handler's stack indicating the cause for the interrupt. The value of new line tag from register 1208 is also placed on the stack. The interrupt handler interprets the cause code, then using the base number from the saved line tag, locates the corresponding base key within the cipher key table in main memory. This base key value is then moved into base key 1202 of the zone management record by calling the SAVE crypto function. The page-rood signal is activated if the page number Pn of the new line tag has changed. When this occurs the sequencing logic 1214 begins computation of a new page key. Since the new and old page number values will initially compare unequal, a new page key must be computed before the cipher key generator can generate a line key.

A new page key is computed by first loading page key 1204 from base key 1202. (FIG. 12). Shifter/extractor 1216 extracts the page number from new line tag 1208. This ordinal value is taken as the number of bits for a right logical rotation of page key register 1204. The result is transformed by nonlinear transform 1218, and this further result is shifted right by the ordinal value of the base number, completing computation of the page key.

To compute the line key corresponding to the line number of the (new) line tag 1208, the contents of page key register 1204 are moved into line key register 1212. The shifter/extractor 1216 extracts the line number of new line tag register 1208 and performs a right circular rotation of the line key 1212 by as many bits, completing computation of a line key. The cipher key generator then outputs this key to the active cipher key register 1104 (of FIG. 11) and asserts the key-available signal to notify the CTU of cycle completion.

The foregoing algorithm generates random, non-repeating cipher keys for programs up to 256 megabytes in size. If required, appropriate parameter changes could increase this value.

The cipher method of this embodiment of the present invention is illustrated further in pseudo code form, using the assignment operator =, and the functions XOR (modulo-2 addition), ORD (extract bits as ordinal), RRC (rotate right circular), and NLT (the nonlinear transform of the Data Encryption Standard (DES) algorithm). Signal variables page-crossed, code-available, zone-disable, crypto-disable were described previously; the pagekey, linekey, basekey, and devkey variables are register names holding the respective key values.

---

Page key computation:

```
IF page-crossed
    AND NOT (crypto-disable OR zone-disable)
    {
    pagekey = segmentkey ;
       temp = ORD( pagenumber ) ;
    pagekey = RRC( temp, pagekey ) ;
    pagekey = NLT( cpukey, pagekey ) ;
       temp = ORD( basenumber ) ;
    pagekey = RRC( temp, pagekey ) ;
    }
END;
```

Line key computation:

```
IF code-available
    AND NOT (crypto-disable OR zone-disable)
    {
    linekey = pagekey ;
       temp = ORD( linenumber ) ;
    linekey = RRC( temp, linekey)
    }
END;
```

---

Decipherment of Cipher Keys

Cipher keys stored in a computer systems main memory are always enciphered under the DEVKEY of the CPU executing the protected program. The crypto functions INIT, READ, SAVE, OPEN, and CONV decipher these enciphered keys into private memory of the crypto microprocessor. The algorithm used to decipher these keys is a variant of the Data Encryption Standard (DES). The DES uses a 56-bit key, while the method in this embodiment uses two 56-bit keys, K1 and K2. The enciphered key is first deciphered under K1, then under K2, then again under K1. The successive application of the DES using two keys is significantly more secure than a single key or just using dual keys.

This specification should not be taken as limiting the invention to a single microcomputer instruction architecture nor to detailed operations as described. Other embodiments of the invention will be apparent to those skilled in the art after considering this specification or practicing the disclosed invention. The specification and examples above are exemplary only, with the true scope of the invention being indicated by the following claims.

I claim:

1. A system for restricting the execution of a computer program comprising:

means for re-enciphering the computer program from a first cipher forms stored on a distribution media to a second cipher form during initial installation of said program onto a predetermined storage means of an authorized computer system wherein said second cipher form is unique to the authorized computer system;

means for loading the computer program in said second cipher form onto the computer system; and means for executing the computer program on the authorized computer system.

2. The system of claim 1 wherein said means for re-enciphering a computer program during installation comprises:

means for sending information identifying said computer program and said authorized computer system to a remote exchange database system, said computer system having a system cipher key, wherein said remote database system returns a program cipher key unique to said computer program, and wherein said program cipher key is itself enciphered under said system cipher key;

means for receiving said enciphered program cipher key from said remote database system; and means for translating said computer program into a second cipher form unique to the authorized computer system wherein said translating means is a function of said program cipher key and said system cipher key.

3. The system of claim 1 where said execution means comprises:

a microprocessor including means for generating an execution cipher key, said generating means having said system cipher key as an input term and further including means for combining said computer instructions with said execution cipher key under a deciphering function, such that unenciphered and executable computer instructions are accessible to the microprocessor but are not externally accessible.

4. The system of claim 2, wherein:

said executing means comprises: a microprocessor including means for generating an execution cipher key.

5. The system of claim 1 wherein said loading means comprises:

means for reading successive portions of said program in said second ciphered form into said computer's main memory; and means for translating said successive portions wherein said translating means deciphers then enciphers said successive portions in one indivisible operation.

6. A system for restricting the execution of a computer program comprising:

means for re-enciphering a computer program from a first cipher form stored on a distribution media to a second cipher form during initial installation of said program onto predetermined storage means of a file server wherein said second cipher form is executable only on authorized computer systems attached to said server;

means for loading said program from said file server onto the authorized computer systems; and means for executing said program on the authorized computer systems.

7. The system of claim 6 wherein said loading means comprises:

means for reading successive portions of said program into the main memory of the authorized computer systems; and means for translating said successive portions wherein said translating means deciphers then enciphers said successive portions in one indivisible operation.

8. A method for restricting the execution of a computer program comprising the steps of:

enciphering a computer program in a first cipher form stored on a distribution media;

initially installing said program in a computer system having a crypto microprocessor by perfoming the steps of:

obtaining data from a remote exchange system;

re-enciphering said program from said first cipher form to a second cipher form by translating said program with said crypto microprocessor an said data; and storing said program onto storage a predetermined means of the computer system in said second form; and transferring said program from the predetermined storage means to the computer system, deciphering said program from said second cipher form to a deciphered form with said crypto microprocessor, and executing said program in said deciphered form.

9. The method according to claim 8 wherein said crypto microprocessor deciphers and enciphers the program in a single indivisible operation.

10. The method according to claim 9 wherein:

said computer system has a system cipher key;

said remote exchange system only releases said data upon receipt of said system cipher key;

said data includes a program cipher key; and said re-enciphering from said first cipher form to said second cipher form is performed by a translation function utilizing said system cipher key and said program cipher key.

11. The method according to claim 9 wherein the computer system executes said program in successive portions wherein said successive portions are deciphered, executed and then enciphered in one indivisible operation.

12. The method according to claim 11 wherein said successive portions are re-enciphered from said second cipher form to a third cipher form, then deciphered and executed.

* * * * *